United States Patent
Bilenko et al.

(10) Patent No.: US 12,522,520 B2
(45) Date of Patent: Jan. 13, 2026

(54) LIGHT RADIATING MODULE AND STERILIZATION APPARATUS COMPRISING THE SAME

(71) Applicant: SEOUL VIOSYS CO., LTD., Gyeonggi-do (KR)

(72) Inventors: Yuriy Bilenko, Gyeonggi-do (KR); Ki Yon Park, Gyeonggi-do (KR); Shi Hyun Ahn, Gyeonggi-do (KR)

(73) Assignee: SEOUL VIOSYS CO., LTD., Ansan-si (KR)

( * ) Notice: Subject to any disclaimer, the term of this patent is extended or adjusted under 35 U.S.C. 154(b) by 1048 days.

(21) Appl. No.: 17/208,983

(22) Filed: Mar. 22, 2021

(65) Prior Publication Data

US 2021/0206664 A1 Jul. 8, 2021

Related U.S. Application Data

(63) Continuation of application No. PCT/KR2019/012293, filed on Sep. 20, 2019.

(30) Foreign Application Priority Data

Sep. 21, 2018 (KR) .................. 10-2018-0113746

(51) Int. Cl.
| | |
|---|---|
| *C02F 1/32* | (2023.01) |
| *A61L 2/08* | (2006.01) |
| *A61L 2/10* | (2006.01) |
| *F24F 8/22* | (2021.01) |
| *F24F 8/80* | (2021.01) |

(52) U.S. Cl.
CPC .............. *C02F 1/325* (2013.01); *A61L 2/084* (2013.01); *A61L 2/085* (2013.01); *A61L 2/10* (2013.01); *F24F 8/22* (2021.01); *F24F 8/80* (2021.01); *A61L 2202/11* (2013.01); *A61L 2202/16* (2013.01)

(58) Field of Classification Search
CPC .......... C02F 1/325; A61L 2/084; A61L 2/085; A61L 2/10; A61L 2202/11; A61L 2202/16
USPC ....................................................... 422/186
See application file for complete search history.

(56) References Cited

U.S. PATENT DOCUMENTS

| | | | | |
|---|---|---|---|---|
| 8,502,695 | B2 * | 8/2013 | Kishimoto | .............. F21S 45/70 |
| | | | | 340/815.57 |
| 10,006,858 | B2 * | 6/2018 | Hart | ................... G01N 15/1459 |

(Continued)

FOREIGN PATENT DOCUMENTS

| | | |
|---|---|---|
| JP | 57-168142 A | 10/1982 |
| JP | 63-001951 A | 1/1988 |

(Continued)

OTHER PUBLICATIONS

Office Action issued in corresponding JP Application No. 2021-515627, issued Apr. 12, 2022, English translation, 3 pages.

(Continued)

*Primary Examiner* — Lore R Jarrett
(74) *Attorney, Agent, or Firm* — Perkins Coie LLP

(57) ABSTRACT

A sterilization apparatus includes a light source unit for emitting light to a sterilization region for sterilizing a target particle, a power supply unit for supplying power to the light source unit, and a photodiode unit for sensing the light from the light source unit. The photodiode unit is driven by the light from the light source unit.

17 Claims, 9 Drawing Sheets

(56) References Cited

U.S. PATENT DOCUMENTS

| | | | |
|---|---|---|---|
| 2002/0162970 A1 | 11/2002 | Sasges | |
| 2009/0075248 A1* | 3/2009 | Debreczeny | G01N 21/51 |
| | | | 435/39 |
| 2012/0280142 A1 | 11/2012 | Johnstone | |
| 2014/0264070 A1* | 9/2014 | Bettles | A61L 2/10 |
| | | | 250/435 |
| 2016/0052802 A1* | 2/2016 | Ochi | C02F 1/325 |
| | | | 250/435 |
| 2017/0101328 A1* | 4/2017 | Smetona | A61L 2/10 |
| 2018/0208486 A1* | 7/2018 | Konagayoshi | A61L 2/24 |
| 2019/0175771 A1* | 6/2019 | Ochi | C02F 1/32 |
| 2019/0178456 A1* | 6/2019 | Niiyama | F21V 9/08 |
| 2019/0200424 A1* | 6/2019 | Mochizuki | H05B 45/56 |

FOREIGN PATENT DOCUMENTS

| | | | | |
|---|---|---|---|---|
| JP | 04-001558 A | | 1/1992 | |
| JP | H05086347 U | | 11/1993 | |
| JP | 2000024655 A | | 1/2000 | |
| JP | 2017176759 A | | 10/2017 | |
| JP | 2018-29048 A | * | 2/2018 | B01J 19/12 |
| JP | 2018029048 | | 2/2018 | |
| JP | 2018030078 | | 3/2018 | |
| JP | 2019-115890 A | * | 7/2019 | A61L 2/10 |
| KR | 1020100030958 | | 3/2010 | |
| KR | 1020130121364 | | 11/2013 | |
| KR | 1020170053431 | | 5/2017 | |
| WO | 2001028933 A1 | | 4/2001 | |
| WO | 2016189800 A1 | | 12/2016 | |
| WO | WO 2017/051774 A1 | * | 3/2017 | A61L 2/10 |

OTHER PUBLICATIONS

International Search Report for International Application PCT/KR2019/012293, mailed Dec. 27, 2019.

Office Action from corresponding Chinese Patent Application No. 2021-515627, dated Nov. 1, 2022 (2 pages).

* cited by examiner

LIGHT RADIATING MODULE AND STERILIZATION APPARATUS COMPRISING THE SAME

CROSS-REFERENCE OF RELATED APPLICATIONS AND PRIORITY

The Present Application is a continuation of International Application No. PCT/KR2019/012293 filed Sep. 20, 2019 which claims priority and the benefit of the filing date of Korean Application No. 10-2018-0113746 filed Sep. 21, 2018, the disclosure of which are incorporated by reference in their entirety.

TECHNICAL FIELD

Embodiments of the present disclosure relate to a light radiation module and a sterilization apparatus including the same, and more particularly, to a light radiation module for detecting bioparticles and/or non-bioparticles, and a sterilization apparatus including the same.

BACKGROUND

Recently, various sterilization apparatuses have been developed to eliminate bacteria that cause food poisoning, such as *Staphylococcus aureus, Salmonella*, and *Vibrio parahaemolyticus*. A UV sterilization apparatus is a typical example of such sterilization apparatuses.

SUMMARY

Embodiments of the present disclosure provide a highly efficient light radiation module which has a small size and costs little to operate, and a sterilization apparatus including the same.

In accordance with one aspect of the present disclosure, a light radiation module having a region in which particles to be eliminated are placed is provided. The light radiation module includes a light source unit emitting light toward the region, a power supply supplying power to at least part of the light source unit, a photodiode unit detecting the light from the light source unit and driven by the light from the light source unit without external power input, and a controller electrically connected to each of the light source unit, the power supply, and the photodiode unit and controlling at least one selected from among the light source unit, the power supply, and the photodiode unit.

In at least one variant, the light source unit may include a first light source emitting a first light toward the region and a second light source emitting a second light sterilizing the region.

In another variant, the photodiode unit may detect the first light emitted from the first light source.

In another variant, the light radiation module may further include a display unit connected to the controller and displaying whether the first light source is in need of replacement based on an intensity of the first light detected by the photodiode unit.

In another variant, the controller may control power supplied from the power supply to the light source unit based on the intensity of the first light detected by the photodiode unit.

In further another variant, the light radiation module may further include a first sensor unit disposed adjacent to the photodiode unit and detecting the first light.

In another variant, the first sensor unit may be powered by the photodiode unit. The first light source may be also powered by the photodiode unit.

In another variant, the light radiation module may further include a second sensor unit disposed adjacent to the light source unit and detecting the intensity of the first light.

In another variant, the first light source may include multiple sub-light sources emitting light having different wavelengths, and the first sensor unit may include multiple sensors corresponding to the respective multiple sub-light sources.

In another variant, the second sensor unit may include multiple sensors corresponding to the respective multiple sub-light sources.

In another variant, the controller may include a comparator unit comparing the intensity of the first light detected by the second sensor unit with the intensity of the first light detected by the first sensor unit to control the light source unit based on results of comparison by the comparator unit.

In another variant, the first sensor unit may detect at least one selected from among scattered light and fluorescence in the region.

In another variant, the sun may be used as the light source unit.

In another variant, the light source unit may emit at least one selected from among infrared light, visible light, and UV light.

In another variant, the light radiation module may be employed in a sterilization apparatus. The sterilization apparatus includes a case providing a sterilization region in which particles to be eliminated are placed and the light radiation module connected to the case and sterilizing the sterilization region.

In another variant, the sterilization region may be a sterilization region inside a pipe and the particles to be eliminated may be particles contained in a fluid in the pipe.

In another variant, the pipe may have an inlet through which the fluid is introduced into the pipe and an outlet through which the fluid is discharged from the pipe, and the light source unit may irradiate an interior of the pipe. Here, the fluid may be water or air.

In another variant, the sterilization region may be a sterilization region in a water bottle, and the particles to be eliminated may be particles contained in water in the water bottle.

In another variant, the light radiation module may be employed in various sterilization apparatuses, for example, a vacuum cleaner, a bedding sterilizer, a clothing sterilizer, a surface sterilizer, an air cleaner, or a deodorizer.

Embodiments according to the teachings of the present disclosure provide a highly efficient light radiation module which has a small size and costs little to operate, and a sterilization apparatus including the same.

DETAILED DESCRIPTION OF EMBODIMENTS

The present disclosure may be realized by various embodiments and some exemplary embodiments of the present disclosure will be described in detail with reference to the accompanying drawings. However, it should be understood that the present disclosure is not limited to the following embodiments and that various modifications, substitutions, and equivalent embodiments can be made by those skilled in the art without departing from the spirit and scope of the present disclosure.

Hereinafter, exemplary embodiments of the present disclosure will be described in detail with reference to the accompanying drawings.

One embodiment of the present disclosure relates to a light radiation module which is adapted to irradiate particles to be treated with germicidal light, such as UV light, to perform various treatments, for example, sterilization. The light radiation module may be applied to various apparatuses, for example, a sterilization apparatus. As one example, the present disclosure will describe the light radiation module for use in and with a sterilization module/sterilization apparatus.

Herein, a target substance to be treated using the sterilization module (that is, particles to be eliminated) may refer to various substances in a region to be sterilized, particularly particles (for example, non-bioparticles or bioparticles, such as dust, microorganisms, fungi, etc.). A fluid contains non-bioparticles formed of at least one of an organic substance and an inorganic substance and/or bioparticles such as cells, bacteria, and viruses. The sterilization module according to this embodiment may detect non-bioparticles and bioparticles in a fluid and kill the bioparticles. Hereinafter, bioparticles and/or non-bioparticles formed of an organic substance and/or an inorganic substance, such as dust, bacteria, fungi, and viruses, are collectively referred to as "particles". The fluid may be air, aerosol, water, or the like. In one embodiment, the term "dust" may refer to non-bioparticles having a predetermined size, such as organic molecules, inorganic molecules, organic/inorganic molecular complexes, and predetermined gases ($SO_2$, $NO_2$, $O_3$, and the like). In addition, the term "bioparticles" may refer to bacteria, fungi, and viruses. Dust, bacteria, fungi, and viruses may have various sizes ranging from nanometers to millimeters. Hereinafter, the target substance to be treated using the sterilization module is referred to as "particles to be eliminated". In one embodiment, treatment of the fluid may include sterilizing, purifying, and deodorizing the particles to be eliminated in the fluid using the sterilization module. However, it will be understood that the treatment is not limited thereto and may include other possible measures using the sterilization module described below.

Figure 1:
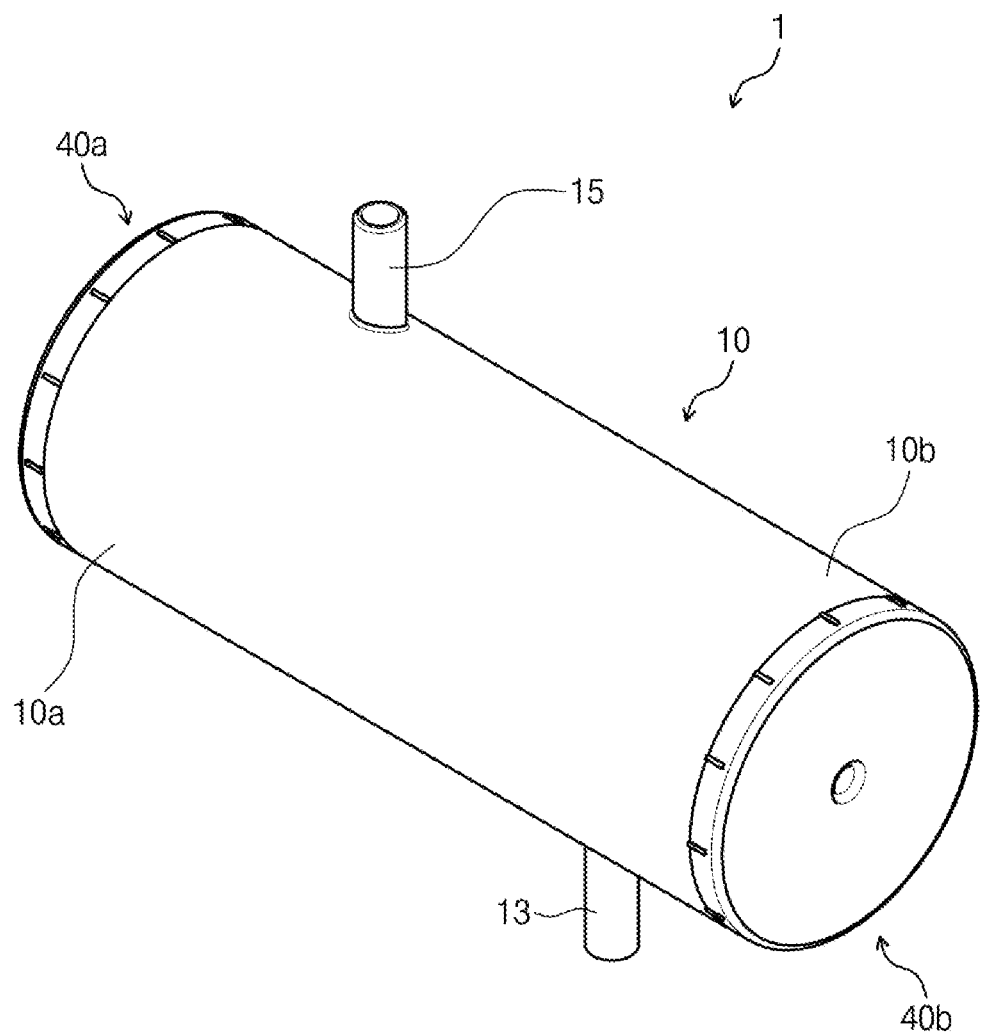
FIG. 1 is a perspective view of a sterilization apparatus according to one or more embodiments of the present disclosure.
Figure 2:
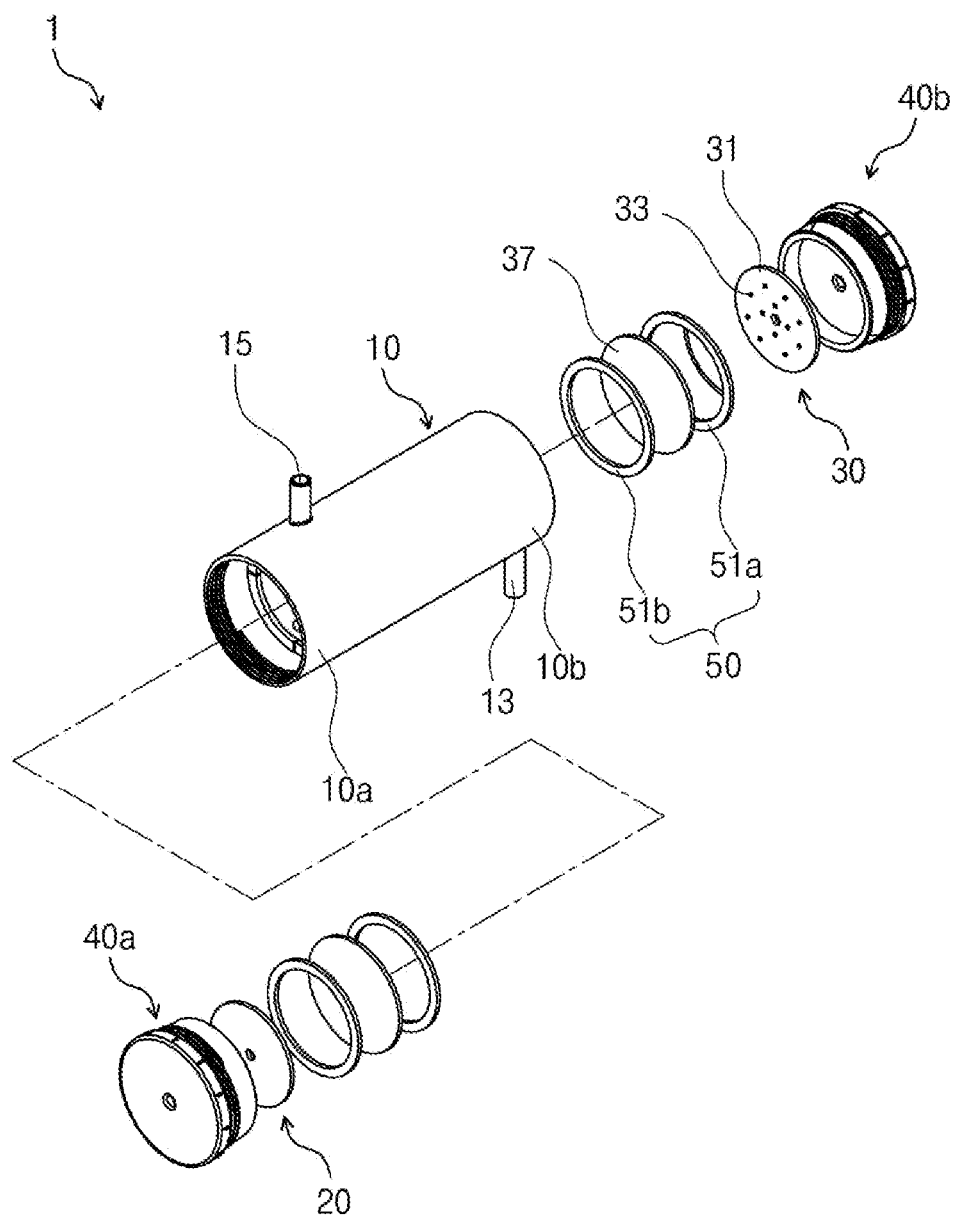
FIG. 2 is an exploded perspective view of the sterilization apparatus of FIG. 1.
Figure 3:
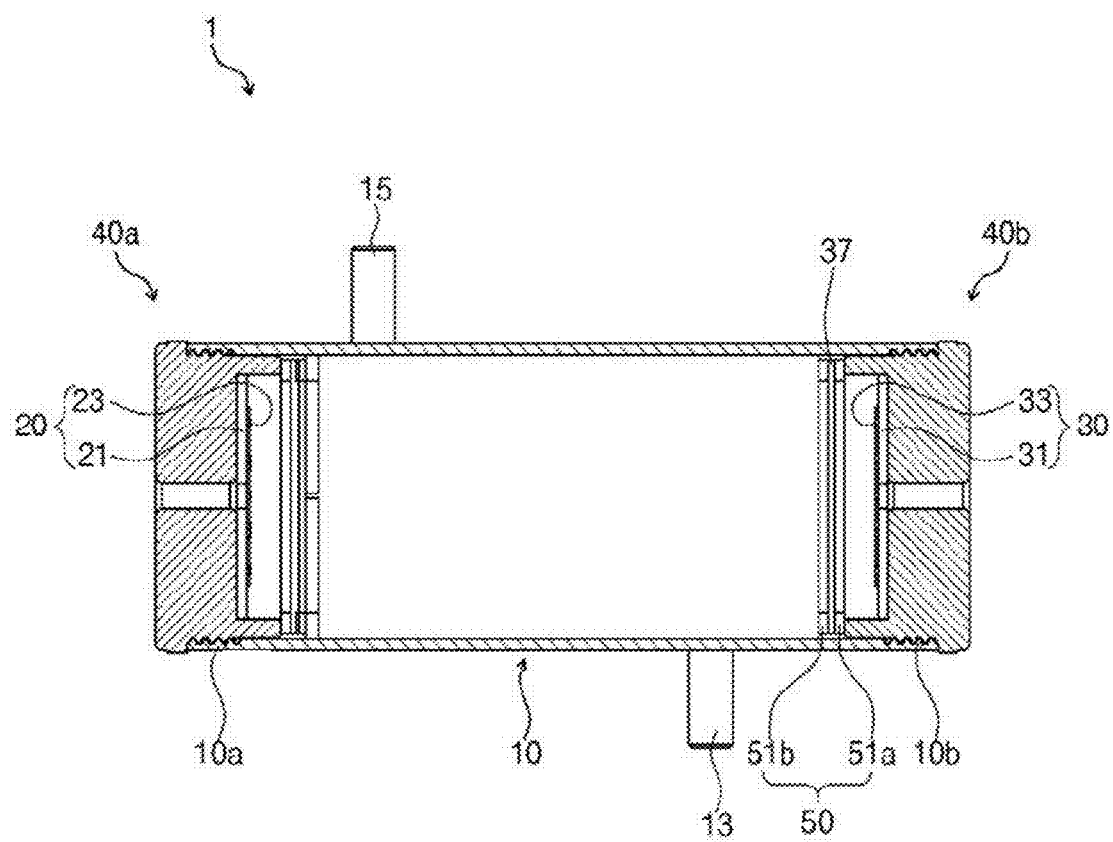
FIG. 3 is a longitudinal sectional view of the sterilization apparatus of FIG. 1.

FIG. 1 is a perspective view of a sterilization apparatus according to one embodiment of the present disclosure, and FIG. 2 is an exploded perspective view of the sterilization apparatus according to the embodiment. FIG. 3 is a longitudinal sectional view of the sterilization apparatus of FIG. 1.

Referring to FIG. 1 through FIG. 3, the sterilization apparatus 1 according to this embodiment includes a pipe 10 receiving a fluid containing particles subject to elimination, a light source unit 30 irradiating an interior of the pipe 10 with light, a power supply supplying power to the light source unit 30, and a photodiode unit 20 detecting the light from the light source unit 30.

The pipe 10 is provided in the form of a rod extending in one direction and corresponds to a case provided therein with a sterilization region for treatment of the fluid. Hereinafter, the direction in which the pipe 10 extends is referred to as an "extension direction" or "longitudinal direction" of the pipe 10.

The pipe 10 has an inlet 13 through which the fluid is introduced into the pipe and an outlet 15 through which the fluid is discharged from the pipe after completion of treatment.

The light source unit 30 (shown in FIGS. 2-3) provides light suitable for treatment of the fluid. The light source unit 30 may be disposed at various locations adjacent to the fluid to emit light for treatment (for example, sterilization, purification, or deodorization) of the fluid. The light source unit 30 may be provided as multiple light source units and may have various shapes. Although, for convenience of description, the light source unit 30 is shown as disposed at the side of one longitudinal end of the pipe 10 in this embodiment, it will be understood that the present disclosure is not limited thereto. The location of the light source unit 30 shown in this embodiment is provided for illustration only and the present disclosure is not limited thereto. The light source unit 30 may be disposed at any location so long as the light source unit 30 can irradiate the interior of the pipe 10. In some forms, the light source unit 30 may be disposed outside the pipe 10. In other forms, the light source unit 30 is disposed inside of the pipe 10, as shown in FIGS. 2-3.

The pipe 10 may be a hollow pipe open at opposite ends in the extension direction thereof. In one embodiment, the pipe 10 may have a cylindrical shape. In this case, the pipe 10 has a circular shape in cross-section. However, it will be understood that the present disclosure is not limited thereto and the pipe 10 may have various other shapes, for example, an elliptical shape, a polygonal shape such as a rectangular shape, and a semicircular shape in cross-section.

The inlet 13 may be connected to one side of the pipe 10 to be connected to the sterilization region in the pipe 10. The fluid introduced into the pipe 10 through the inlet 13 is an object or particles in need of sterilization, purification, deodorization, or the like.

In one embodiment, the opposite longitudinal ends of the pipe 10 are referred to as a first end 10a and a second end 10b, respectively, and the inlet 13 and the outlet 15 may be disposed at the sides of the first and second ends 10a, 10b, respectively, without being limited thereto.

The inlet 13 and the outlet 15 may have different sizes to control the moving speed of the fluid inside the pipe 10. If the speed of the fluid at the inlet 13 is different from the speed of the fluid at the outlet 15, the fluid can stay longer in the pipe 10. To this end, in some forms, the inner diameter of the inlet 13 may be different from the inner diameter of the outlet 15.

As shown in FIG. 2, first and second caps 40a, 40b are fastened to the first and second ends 10a, 10b of the pipe 10, respectively. In some forms, each of the first and second caps 40a, 40b may have a fastening portion coupled to the pipe 10. In other forms, the fastening portion may be provided in various forms. Specifically, the first cap 40a is disposed at the first end 10a of the pipe 10 to be fastened to the pipe 10. The second cap 40b is disposed at the second end 10b of the pipe 10 to be fastened to the pipe 10. Each of the first and second caps 40a, 40b may be formed of any suitable material without limitation.

The light source unit 30 emits light and may be disposed at the side of the second end 10b of the pipe 10. The light source unit 30 may include a substrate 31 and a light emitting diode 33 mounted on the substrate 31. The substrate 31 may be provided in various forms, for example, in the form of a disk having a diameter that corresponding to the diameter of the pipe 10. Multiple light emitting diodes 33 may be arranged in a predetermined direction on the substrate 31. The substrate 31 may include an outlet to which wires carrying power to the light emitting diodes 33 are connected.

The light source unit 30 includes multiple light emitting diodes 33, and the light emitting diodes 33 may emit light having the same wavelength or may emit light having different wavelengths. For example, in some forms, all the light emitting diodes 33 may emit UV light having the same or similar wavelength. In other forms, some light emitting diodes 33 may emit UV light having a specific wavelength and the other light emitting diodes 33 may emit UV light having a wavelength different from the specific wavelength.

In some forms, the light source unit 30 includes multiple light emitting diodes 33 emitting light having different wavelengths. The light emitting diodes 33 may be arranged in various orders. For example, a light emitting diode 33 emitting light having a first wavelength and a light emitting diode 33 emitting light having a second wavelength different from the first wavelength may be alternately arranged.

In one embodiment, the light source unit 30 may emit light in various spectra, for example, light in the UV spectrum, light in the visible spectrum, and light in the infrared spectrum, depending on the type of fluid to be treated or the type of object or particles to be killed (for example, germs, fungi, bacteria, and the like).

In one embodiment, to sterilize the fluid, the light source unit 30 may emit light having a germicidal wavelength. For example, the light source unit 30 may emit light in the UV spectrum. In one embodiment, the light source unit 30 may emit light in the wavelength band of about 100 nm to about 405 nm, which is germicidal to microorganisms. For example, the light source unit 30 may emit light in the wavelength band of about 100 nm to about 280 nm. More specifically, the light source unit 30 may emit light in the wavelength band of about 180 nm to about 280 nm. The light source unit 30 may emit light in the wavelength band of about 250 nm to about 260 nm. UV light in the above wavelength bands has high germicidal efficacy. For example, UV irradiation at an intensity of 100 μW/cm² can kill about 99% of bacteria, such as *Escherichia coli*, diphtheria *bacillus*, and dysentery *bacillus*. In addition, UV light in the above wavelength ranges can kill bacteria that cause food poisoning, such as pathogenic *Escherichia coli*, *Staphylococcus aureus, Salmonella* Weltevreden, *S. typhimurium, Enterococcus faecalis, Bacillus cereus, Pseudomonas aeruginosa, Vibrio parahaemolyticus, Listeria monocytogenes, Yersinia enterocolitica, Clostridium perfringens, Clostridium botulinum, Campylobacter jejuni,* or *Enterobacter sakazakii*.

In one embodiment, the light source unit 30 may emit light having various wavelengths and at least part of the sterilization apparatus 1 may include a material that causes a catalytic reaction in response to light emitted from the light source unit 30. For example, a photocatalytic layer formed of a photocatalytic material may be disposed on the entirety or a portion of an inner surface and/or an outer surface of the pipe 10 according to the present disclosure. The photocatalytic layer may be disposed in any region so long as the light emitted from the light source unit 30 can reach the region.

The photocatalytic layer is activated by the light emitted from the light source unit, for example, UV light, to cause a chemical reaction, thereby decomposing various contaminants, bacteria, and the like in the fluid contacting the photocatalytic layer through redox action.

Although not shown in the drawings, the sterilization apparatus 1 according to this embodiment may further include a power supply supplying power to the light source unit 30 and a controller controlling the light source unit 30 and the power supply. The power supply and/or the controller may be disposed outside the pipe 10 and may be connected to the light source unit 30 inside the pipe 10 through the wires. The controller may be implemented by a driving circuit mounted on a circuit board. In this case, the light source unit 30 and the power supply may be controlled through the driving circuit.

The photodiode unit 20 detects the light from the light source unit 30. The photodiode unit 20 may be disposed at the side of the first end 10a of the pipe 10, as shown in FIGS. 2-3. The photodiode unit 20 may include a substrate 21 and a photodiode 23 mounted on the substrate 21. The substrate 21 may be provided in various forms, for example, in the form of a disk corresponding in diameter to the pipe 10. A single or multiple photodiodes 23 may be arranged on the substrate 21. The photodiode unit 20 may be spaced apart from the light source unit 30 such that the sterilization region adapted to have particles or objects subject to elimination can be defined between the light source unit 30 and the photodiode unit 20. That is, the light emitted from the light source unit 30 is detected by the photodiode unit 20 after passing through the sterilization region.

Light detected by the photodiode unit 20 has wavelength corresponding to that of the light emitted from the light source unit 30. For example, the light detected by the photodiode unit 20 may be light having the same wavelength as the light emitted from the light source unit 30 or may be wavelength-converted light.

In one embodiment, the photodiode unit 20 is not separately supplied with external power and, similar to a solar cell, is driven using the light supplied from the light source unit 30 as an energy source. That is, the photodiode unit 20 is driven without external power input.

The photodiode 23 of the photodiode unit 20 may be a diode (having a P-N structure or a P-I-N structure) that generates electron-hole pairs upon receiving light. When the light from the light source unit 30 hits the photodiode 23, electric current flows through the photodiode 23, whereby the photodiode 23 can use the current flow as a power source. Accordingly, the photodiode 23 can detect an irradiance from the light source unit 30 without external power input. Here, the photodiode 23 may be provided as a single or multiple photodiodes. If electric current generated by one photodiode 23 is weak, multiple photodiodes 23 may be connected in parallel. Alternatively, an integrated circuit in which multiple photodiodes 23 are integrated into one chip may be used.

Each of the light source unit 30 and the photodiode unit 20 may further include a transmissive window 37 transmitting light from the light emitting diode 33 or the photodiode 23 therethrough, in addition to the substrate 21 or 31 and the light emitting diode 33 or the photodiode 23.

The transmissive window 37 serves to protect the substrates 21, 31, the light source 33, and the photodiode 23 and may be formed of a transparent, electrically insulating material. However, it will be understood that the present disclosure is not limited thereto and the transmissive window 37 may be formed of various other materials. For example, the transmissive window 37 may be formed of quartz or an organic polymer. Here, since the wavelength of light absorbed/transmitted by/through the organic polymer depends on the type of monomers used, the method used to form the organic polymer, and the condition in which the organic polymer material is formed, the organic polymer may be selected in consideration of wavelengths of light emitted from the light sources. For example, organic polymers such as poly(methyl methacrylate) (PMMA), polyvinyl alcohol (PVA), polypropylene (PP), and low-density polyethylene (PE) absorb little or no UV light, whereas polymer resins such as polyester can absorb UV light.

In this embodiment, the substrates 21, 31 and the transmissive window 37 may correspond to the pipe 10 in terms of shape and size.

The sterilization apparatus 1 according to this embodiment may further include at least one sealing member 50 to tightly fasten the pipe 10 to the first and second caps 40a, 40b and to prevent the fluid from leaking out of the sterilization apparatus.

In one embodiment, sealing members 50 may be disposed between the first cap 40a and the first end 10a of the pipe 10 and between the second cap 40b and the second end 10b of the pipe 10, respectively. Each of the sealing members 50 may include first and second sealing members 51a, 51b disposed between the substrate 21 or 31 and the transmissive window 37 and between the transmissive window 37 and a stepped portion formed on the inner surface of the pipe 10, respectively. The first and second sealing members 51a, 51b serve to tightly fasten the pipe 10 to the first and second caps 40a, 40b while preventing the fluid in the sterilization region from leaking out through a gap between the pipe 10 and the first and second caps 40a, 40b. Each of the first and second sealing members may be provided as a single or multiple sealing members.

Each of the sealing members 51a, 51b has a closed cross-section to tightly fasten an inner region and an outer region of a main body of the pipe 10 to each other and to isolate and seal the two regions from each other. For example, each of the first and second sealing members 51a, 51b may be provided in the form of an O-ring, as shown in FIG. 2.

Each of the sealing members 51a, 51b may be formed of a soft elastic material. When the sealing members 51a, 51b are formed of such an elastic material, the sealing members 51a, 51b can be compressed against the main body of the pipe 10 upon fastening the pipe 10 to the first and second caps 40a, 40b, thereby maintaining a tight fastening structure.

Although the elastic material forming the sealing members 51a, 51b may include a silicone resin, it will be understood that the present disclosure is not limited thereto and the sealing members 51a, 51b may be formed of any other suitable material. For example, natural or synthetic rubber or other elastic organic polymers may be used as the elastic material.

Figure 4:
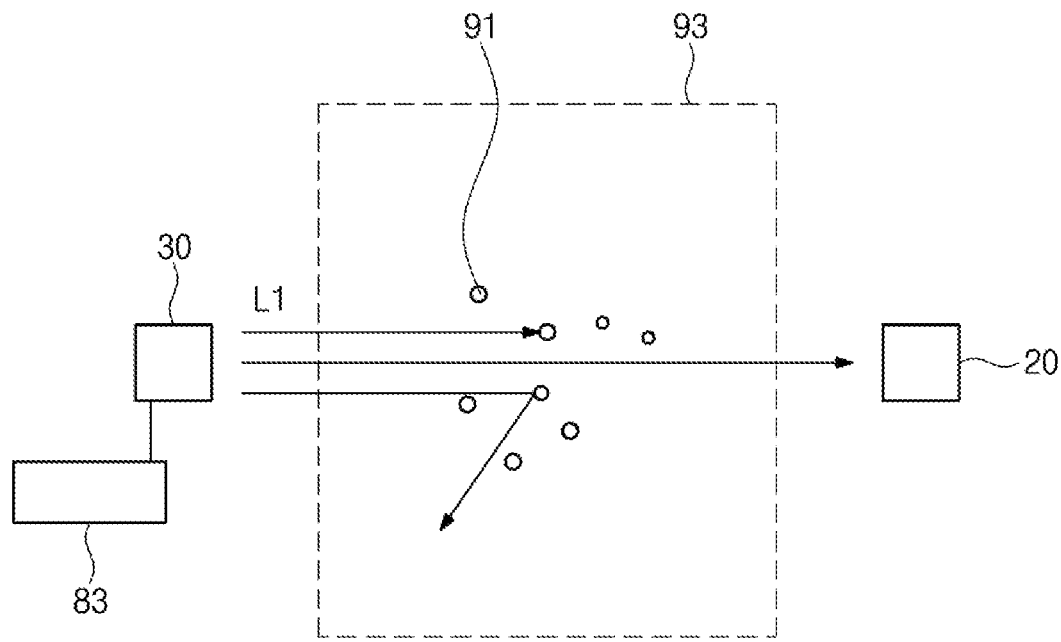
FIG. 4 is a conceptual diagram illustrating a sterilization module as set forth above along with an optical path therein.

FIG. 4 is a conceptual diagram of a sterilization module as set forth above along with an optical path therein. In FIG. 4, some components are omitted for convenience of description. Here, the illustrated optical path represents only a general optical path among many optical paths, for convenience of description. That is, not all light components emitted from the light source unit travel along the illustrated optical path and some light components can travel along different optical paths.

Referring to FIG. 4, a sterilization module according to one embodiment of the present disclosure includes a light source unit 30 emitting light, a power supply 83 supplying power to the light source unit 30, and a photodiode unit 20 detecting the light from the light source unit 30 and driven with the detected light without external power input.

In this embodiment, the light source unit 30 and the photodiode unit 20 may face each other with a sterilization region 93 adapted to have particles 91 placed therebetween.

The light source unit 30 and/or the photodiode unit 20 may be disposed inside or outside the sterilization region 93. The sterilization region 93 is not particularly restricted in terms of the shape and size thereof. For example, the sterilization region 93 may be provided in the form of a sterilization region 93 in a pipe 10, that is, in the form of a cylindrical sterilization region, as shown in FIG. 1 to FIG. 3. Although the sterilization region 93 is shown as having a rectangular shape in FIG. 4, this is for convenience of description and the actual shape of the sterilization region 93 may be different therefrom.

The locations of the light source unit 30 and the photodiode unit 20 are not limited to those illustrated in FIG. 4. That is, the light source unit 30 and the photodiode unit 20 may be disposed away from the sterilization region 93 or may be disposed inside the sterilization region 93 with particles 91 placed therein. In addition, although the light source unit 30 and the photodiode unit 20 are shown as facing each other in FIG. 4, it will be understood that the present disclosure is not limited thereto and the light source unit 30 may be disposed at any location so long as the light source unit 30 can supply sufficient light to eliminate the particles 91 and the photodiode unit 20 may be disposed at any location so long as the photodiode unit 20 can sufficiently detect light having passed through the sterilization region 93.

In this embodiment, the power supply 83 is connected to the light source unit 30 to supply power to the light source unit 30. The light source unit 30 is driven by the power from the power supply 83 to emit light. As described above, the light emitted from the light source unit 30 may include light in various wavelength ranges, for example, infrared light, visible light, and UV light. In one embodiment, the light emitted from the light source unit 30 may be UV light.

In one embodiment, when the light emitted from the light source unit 30 is referred to as a first light L1, the photodiode unit 20 may detect the first light L1 emitted from the light source unit 30 and having passed through the sterilization region 93.

Although the first light L1 may be light having a single wavelength with a narrow full width at half maximum, it will be understood that the present disclosure is not limited thereto and the first light L1 may be light in a broad wavelength range. The wavelength of the first light L1 emitted from the light source unit 30 may vary depending on the type of particles 91 subject to illumination, photoreactivity of particles 91, the type of photodiode unit 20, and the like.

In this embodiment, the first light L1 may include at least one selected from among infrared light, visible light, and UV light. In one embodiment, the first light L1 may have a wavelength in the range of 210 nm to 1,200 nm.

The first light L1 emitted from the light source unit 30 may be partially absorbed by the particles 91 in the sterilization region 93 as well as reflected and/or scattered by the particles 91.

Upon absence of the particles 91 in the sterilization region, the photodiode unit 20 primarily detects the light emitted from the light source unit 30, that is, light not hitting the particles 91. Conversely, when scattering, reflection, or absorption of light by the particles 91 occurs, the photodiode unit 20 may also detect light resulting from scattering, reflection, or absorption by such particles 91. As such, the first light L1 detected by the photodiode unit 20 may include a light component not hitting the particles 91 and/or a light component hitting the particles 91 and may measure the presence and amount of the particles 91 through detection of these light components with the photodiode unit 20.

In this embodiment, the light source unit 30 is connected to the power supply 83 to be supplied with power from the power supply 83, as shown in FIG. 4. Conversely, the photodiode unit 20 is not connected to the power supply 83 and is driven using the first light L1 as a power source without external power input.

Figure 5:
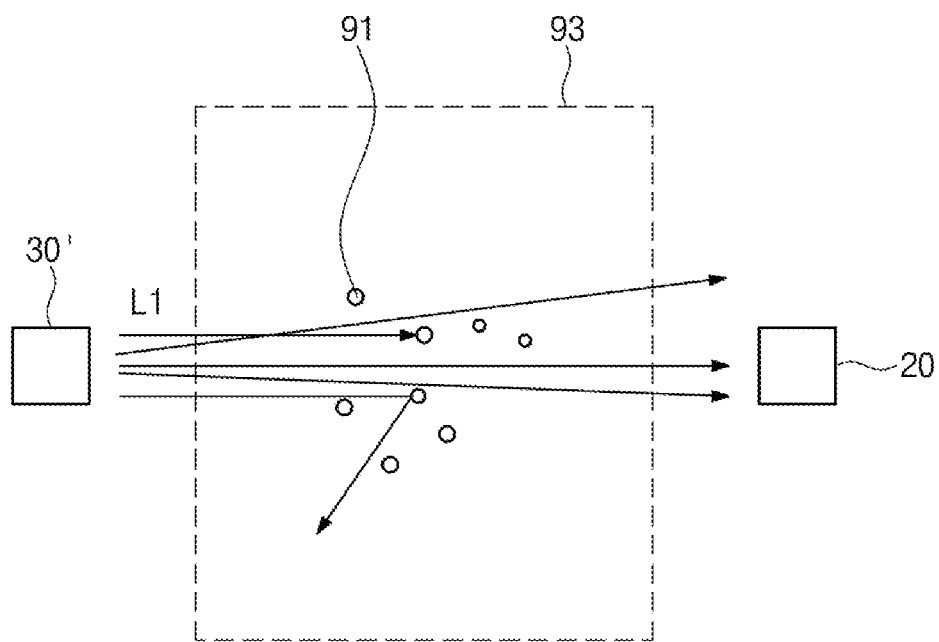
FIG. 5 is another conceptual diagram of a sterilization module according to one or more embodiments of the present disclosure.

Although not shown in FIGS. 4-5, the light source unit 30, the power supply 83, and the photodiode unit 20 may be electrically connected to a controller controlling the light source unit 30, the power supply 83, and the photodiode unit 20. The controller may control an irradiance or intensity of the light emitted from the light source unit 30 through control over the power supply 83 based on an irradiance or intensity of the first light L1 detected by the photodiode unit 20.

In some forms, the sterilization module according to this embodiment may further include a display unit connected to the controller. The display unit may display whether the light source unit 30 is in need of a replacement based on the intensity of the first light L1 detected by the photodiode unit 20.

The sterilization module set forth above can allow substantially real-time monitoring of germicidal effects on the particles 91 by directly detecting the light having passed through the particles 91 using the photodiode unit 20.

Typical sterilization modules performing elimination of target particles by applying germicidal light to the target particles require a separate laborious and time-consuming analysis after application of the light to check whether proper sterilization has been achieved. Further, since prolonged exposure to UV light used in a UV-based sterilization module is harmful to humans, it is necessary to limit emission of UV light only to an extent needed for elimination of target particles.

According to the present disclosure, germicidal effects of irradiation with the light source unit can be determined in real time. Accordingly, power consumption can be reduced by reducing the irradiation intensity or irradiation time upon determination that sufficient sterilization has been achieved, thereby providing high germicidal effects at low cost. In other words, the sterilization module according to the embodiment of the present disclosure can be controlled in various ways based on substantially real-time information on the type, quantity, and density of particles to be eliminated, thereby allowing low-cost, high-efficiency sterilization.

In addition, according to this embodiment, even when a photodiode unit is employed, costs for power supply can be reduced as the photodiode unit can be configured to be driven using the light emitted from the light source unit as a power source, i.e., without external power input. In other words, the photodiode unit is not separately supplied with external power and similar to a solar cell, is driven using the light from the light source unit as an energy source. That is, the photodiode unit is driven by recycling the light from the light source unit, and therefore, no separate additional energy source may be used to drive the photodiode unit.

Further, no separate power supply may be provided to the photodiode unit, and it is easy to downsize the sterilization module. Unlike a typical sterilizer requiring a bulky power supply, the sterilization module according to the present disclosure can be portable and have no power supply connected to the photodiode unit.

FIG. 5 is a conceptual diagram of a sterilization module according to another embodiment of the present disclosure.

Referring to FIG. 5, in the sterilization module according to this embodiment of the present disclosure, the sun may be used as a light source unit 30'. The sun emits light in a very broad and continuous range of wavelengths. In other words, since sunlight contains a light component having a germicidal wavelength, the sterilization module may use the sun as the light source unit 30' for sterilization without using an artificial light source. When the sun may be used as the light source unit 30', the first light L1 emitted from the sun includes light in the UV, visible, and infrared spectra.

According to this embodiment, with use of the sun as the light source unit 30', it is possible to eliminate the need to provide an artificial light source unit, thereby significantly reducing the volume and manufacturing cost of the sterilization module and thus making it easy to implement a portable, compact sterilization module. In addition, when the sun is used as a power source, more light can be provided to the photodiode unit 20 than when any other light sources are used, thereby allowing stable operation of the photodiode unit 20.

Particularly, when the sun is used as the light source unit 30', the volume and weight of the sterilization module can be minimized since a separate power source for the light source unit can be omitted. As a result, portability and compact size of the sterilization module can be maximized.

In one embodiment, the photodiode unit may be used not only to detect the irradiance or intensity of light, but also as a power source for driving a separate sensor unit by recycling the light from the light source unit.

Figure 6:
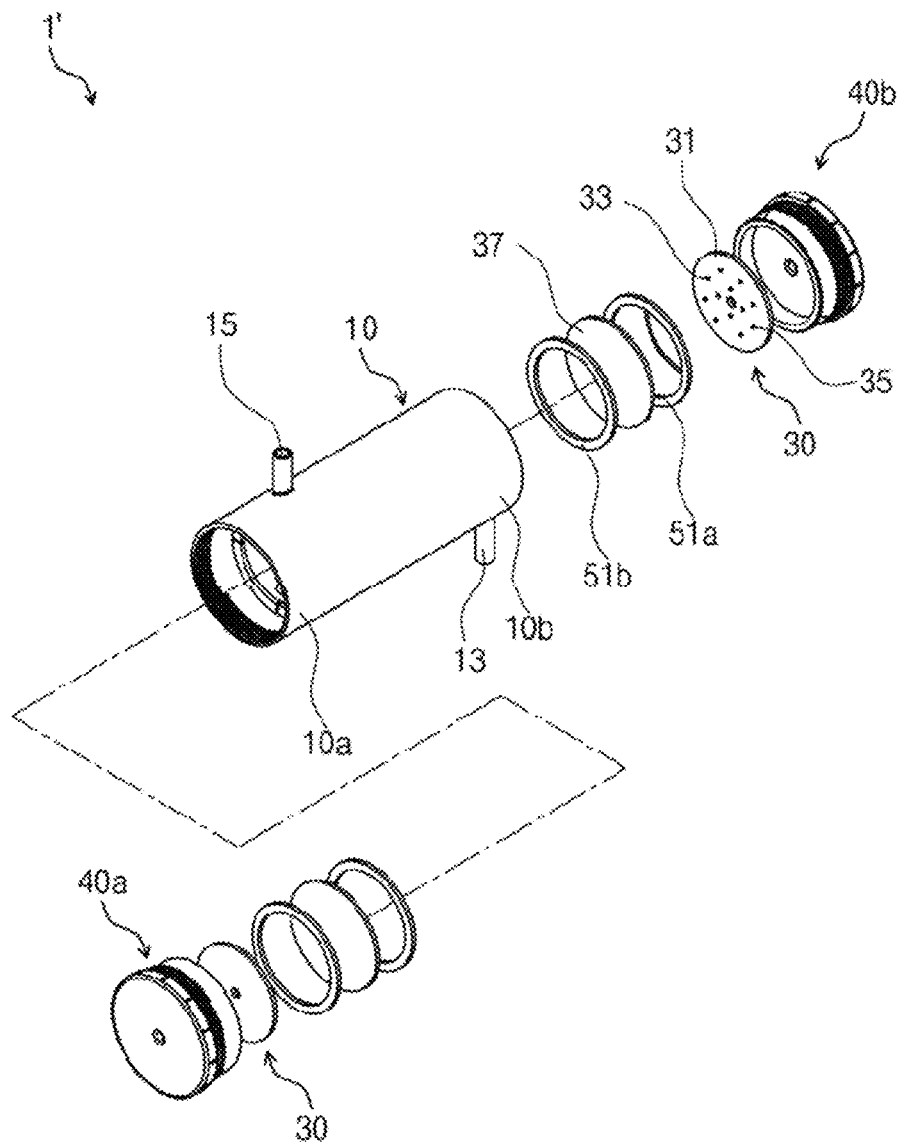
FIG. 6 is an exploded perspective view of a sterilization module according to another embodiment of the present disclosure.
Figure 7:
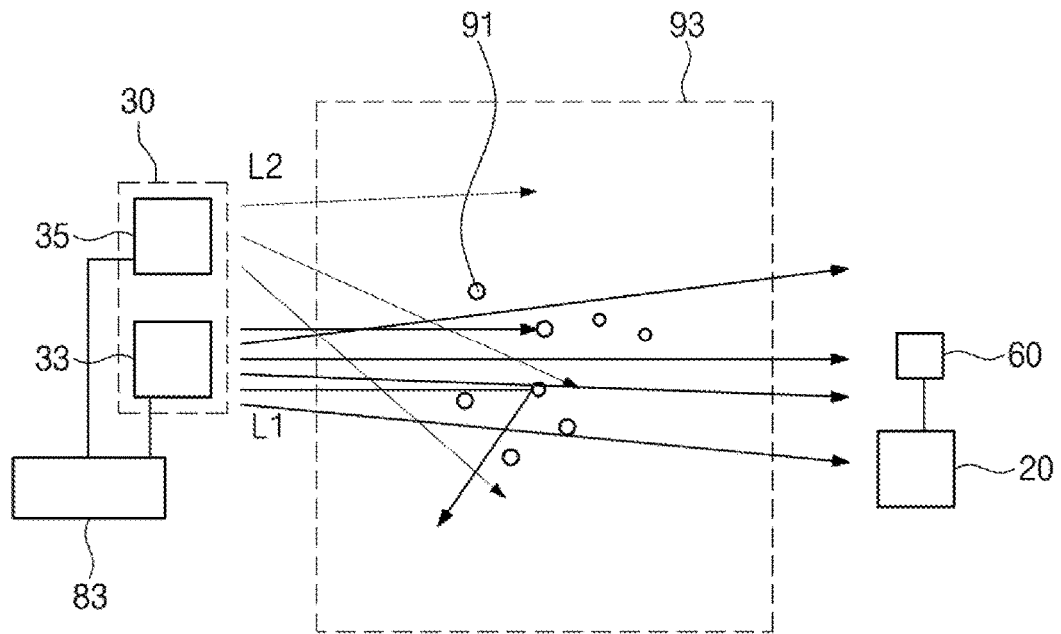
FIG. 7 is a conceptual diagram of the sterilization module of FIG. 6.

FIG. 6 is an exploded perspective view of a sterilization module according to another embodiment, and FIG. 7 is a conceptual diagram of the sterilization module of FIG. 6. Here, the sterilization module 1' according to this embodiment differs from the sterilization module described in the above embodiments in that light supplied from a light source unit thereof is different from the light supplied from the light source unit according to the above embodiment and a first sensor unit is further provided.

Referring to FIG. 6 and FIG. 7, the sterilization module 1' according to this embodiment includes a light source unit 30 providing a fluid in a sterilization region 93 with light germicidal to particles 91 to be eliminated in the fluid and light suitable for detecting the particles to be eliminated in the sterilization region 93. In other words, the light source unit 30 is disposed at various locations adjacent to the fluid and emits light suitable for treatment (for example, sterilization, purification, or deodorization) of the fluid and light suitable for detecting various substances in the treated fluid.

The light source unit 30 includes a substrate 31, a first light source 33 emitting a first light L1 having various wavelengths depending on the size, type, and characteristics of a substance to be detected, and a second light source 35 emitting a second light L2 suitable for sterilization of the sterilization region. Each of the first light source 33 and the second light source 35 may be implemented with a light emitting diode. In this case, each of the first light source 33 and the second light source 35 may be mounted on the substrate 31. Here, each of the first light source 33 and the second light source 35 may be provided as multiple light sources, wherein the multiple light sources may be arranged in a predetermined direction. When the first light source 33 is provided as multiple light sources, the multiple light sources may emit light having the same wavelength or may emit light having different wavelengths. Likewise, when the second light source 33 is provided as multiple light sources, the multiple light sources may emit light having the same wavelength or may emit light having different wavelengths.

The wavelength of the first light L1 emitted from the first light source 33 may vary depending on the type of particles to be detected, reactivity of the particles thereto, and the type of photodiode used. When an particle to be detected, that is, particles, is large in size, the first light source 33 may be configured to emit light having a relatively long wavelength in consideration of the size of the particles. When particles to be detected are small in size, the first light source 33 may be configured to emit light having a relatively short wavelength in consideration of the size of the particles. Alternatively, when the particles to be detected can absorb light having a specific wavelength or emit fluorescence upon absorption of the light having the specific wavelength, the first light source 33 may be configured to emit light having a wavelength corresponding to the absorption wavelength of the particles.

In one embodiment, when the particles to be detected contain a phosphor, the first light source 33 may be configured to emit light having a wavelength capable of exciting the phosphor. In particular, when the particles to be detected are bioparticles, the first light source 33 may be configured to emit light having a wavelength capable of exciting a phosphor in the bioparticles. In this case, the first light source 33 may emit UV light and/or visible light.

When particles that fluoresce in response to light are a detection target, the first light source 33 according to the present disclosure may emit UV light corresponding to the absorption wavelength of a phosphor in the particles. For example, when the phosphor in the particles is Nicotinamide adenine dinucleotide+Hydrogen (NADH), the first light source 33 may emit UV light having a wavelength of 340 nm, and, when the phosphor in the particles is riboflavin, the first light source 33 may emit UV light having a wavelength of 450 nm.

Fluorescence refers to emission of light by a substance upon exposure to stimulating radiation, wherein the wavelength of emitted light is different from the wavelength of incident light. Bioparticles may contain a phosphor that fluoresces. For example, exposure to 280 nm UV light can excite tryptophan, tyrosine, phenylalanine, and fluorescent amino acid in bioparticles, causing fluorescence at a wavelength of 350 nm. In addition, exposure to 340 nm UV light can excite NADH (or NADPH: Nicotinamide adenine dinucleotide phosphate+Hydrogen) in bioparticles, causing fluorescence at a wavelength of 450 nm. Further, exposure to 450 nm UV light can excite riboflavin in bioparticles, causing fluorescence at a wavelength of 520 nm. Accordingly, through a process of irradiating the atmosphere with light having a wavelength corresponding to the absorption wavelength of bioparticles, followed by detection of fluorescence resulting from irradiation with the light, it is possible to determine what phosphor is contained in the atmosphere and whether particles to be detected are contained in the atmosphere based on analysis of the detected phosphor.

In some forms, when the first light source 33 emits light in the UV spectrum and/or the visible spectrum, it is possible to detect dust, microorganisms including bacteria, fungi, and the like.

In one embodiment, the first light source 33 may emit UV light in the wavelength band of about 220 nm to about 1,200 nm in order to detect dust, microorganisms, fungi, and the like. Detection of dust may be achieved using light in the wavelength band of about 220 nm to 1,200 nm, and detection of microorganisms and fungi may be achieved using light in the wavelength band of about 220 nm to about 450 nm.

The first light source 33 emits light having a specific wavelength, and may include various light sources. In one embodiment, the first light source 33 may include at least one light source. Each light source may include a first light emitting diode, a laser, a lamp, and the like. In addition, the first light source 33 may supply light in continuous wave form or pulse form.

The second light L2 emitted from the second light source 35 is light suitable to sterilize the sterilization region. The wavelength of the second light L2 may vary depending on the type of fluid to be treated and the type of particles to be eliminated (for example, germs, fungi, bacteria, and the like). In particular, in some forms, the second light L2 may have a germicidal wavelength, for example, a wavelength in the UV spectrum. As one example, the second light source 35 may emit light in the wavelength band of about 100 nm to about 405 nm, which is germicidal to microorganisms. As another example, the second light source 35 may emit light in the wavelength band of about 100 nm to about 280 nm. As further another example, the second light source 35 may emit light in the wavelength band of about 180 nm to about 280 nm. In other forms, the second light source 35 may emit light in the wavelength band of about 250 nm to about 260 nm.

In addition to the aforementioned components, the sterilization module according to this embodiment may further include a first sensor unit 60 disposed adjacent to the photodiode unit 20 and configured to detect the first light L1.

In this embodiment, the first sensor unit 60 detects the light from the light source unit 30, particularly the first light L1 from the first light source 33, and the photodiode unit 20 functions as a power supply supplying power to the first sensor unit 60.

In this embodiment, the light detected by the first sensor unit 60 corresponds in wavelength to the first light L1 emitted from the first light source 33. For example, the light detected by the first sensor unit 60 may be light having the same wavelength as the light emitted from the first light source 33 or wavelength-converted light.

The first sensor unit 60 may include various sensors that can detect the first light L1, without limitation. For example, the first sensor unit 60 may include a sensor that detects scattered light and/or fluorescence in the sterilization region 93. In particular, the first sensor unit 60 may include a sensor that detects the light emitted from the light source unit, scattered light, reflected light, absorbed light, or fluorescently emitted light. In this case, the first sensor unit 60 may include a sensor that detects light having a wavelength identical to or different from the wavelength of the light emitted from the light source unit. For example, when the light emitted from the first light source 33 is UV light, the first sensor unit 60 may include a UV sensor. However, it will be understood that the present disclosure is not limited thereto and the first sensor unit 60 may be a visible light sensor or an infrared sensor, which detects visible light or infrared light having a longer wavelength than UV light. The reason for this is that, when light is scattered or reflected by particles, the scattered or reflected light has the same wavelength as the original light, whereas fluorescently emitted light has a longer wavelength than absorbed light. When the light emitted from the first light source 33 is visible light, the first sensor unit 60 may include a visible light sensor or an infrared sensor detecting infrared light having a longer wavelength than the visible light. Likewise, when the light emitted from the first light source 33 is infrared light, the first sensor unit 60 may be an infrared sensor or a sensor that detects light having a longer wavelength than the infrared light.

In other forms, the first sensor unit 60 may detect fluorescence. Since autofluorescence of microorganisms is a very fine signal, the first sensor unit 60 may include, for example, a photomultiplier tube (PMT) as a detection sensor.

In another form, the first sensor unit 60 is not separately supplied with external power, and is driven by energy generated by the photodiode unit 20 using the light from the first and second light sources 33, 35, particularly, the second light L2 from the second light source 35, as an energy source, similar to a solar cell. That is, the first sensor unit 60 is driven by energy generated by the photodiode unit 20 which is obtained by recycling the light from the light source unit 30. As a result, no separate additional energy source may be used to drive the first sensor unit 60.

In this embodiment, the first sensor unit 60 is connected to the photodiode unit 20 to be powered by the photodiode unit 20. The photodiode unit 20 functions not only as a detection sensor detecting the first light L1, but also as a photocell generating electric current using the received first light L1. The electric current generated by the photodiode unit 20 is supplied to the first sensor unit 60 to drive the first sensor unit 60. In other words, the first sensor unit 60 is powered by the photodiode unit 20 without being connected to a separate power supply 83.

The sterilization module can allow real time monitoring of germicidal effects on the particles 91 through direct detection of the light having passed through the particles 91 using the first sensor unit 60. In addition, since the first sensor unit 60 is driven by power generated by the photodiode unit 20 using the light emitted from the light source unit 30 without external power input, power supply costs can be reduced. Further, as a separate power supply to the photodiode unit 20 and the first sensor unit 60 may not be used, the sterilization module can be more compact and portable.

Although not shown in the drawings, the light source unit 30, the power supply 83, the first sensor unit 60, and the photodiode unit 20 may be electrically connected to a controller controlling the light source unit 30, the power supply 83, and the photodiode unit 20. The controller may control the irradiance or intensity of the light from the light source unit 30 through control over the power supply 83 based on the irradiance or intensity of the first light L1 detected by the first sensor unit 60.

In addition, in this embodiment, the photodiode unit 20 may serve not only to supply power to the first sensor unit 60, but also to detect the irradiance of the first light L1 in substantially real time, and the first sensor unit 60 may serve to detect fluorescence at a specific wavelength due to sterilization effects. In this case, since detection of light is performed using both the photodiode unit 20 and the first sensor unit 60, it is possible to determine which one of the light source unit 30 and the particles 91 has influenced the detected light. If there is no significant difference in irradiance measured by the first sensor unit 60 between before and after irradiation with the light source unit despite significant reduction in irradiance of the first light L1 measured by the photodiode unit 20, a determination may be made that the light source unit 30 may not properly operate. In this case, the first light source 33 may be replaced.

Additionally, the photodiode unit may apply power not only to the first sensor unit, but also to other components that require power, for example, the first light source unit.

Figure 8:
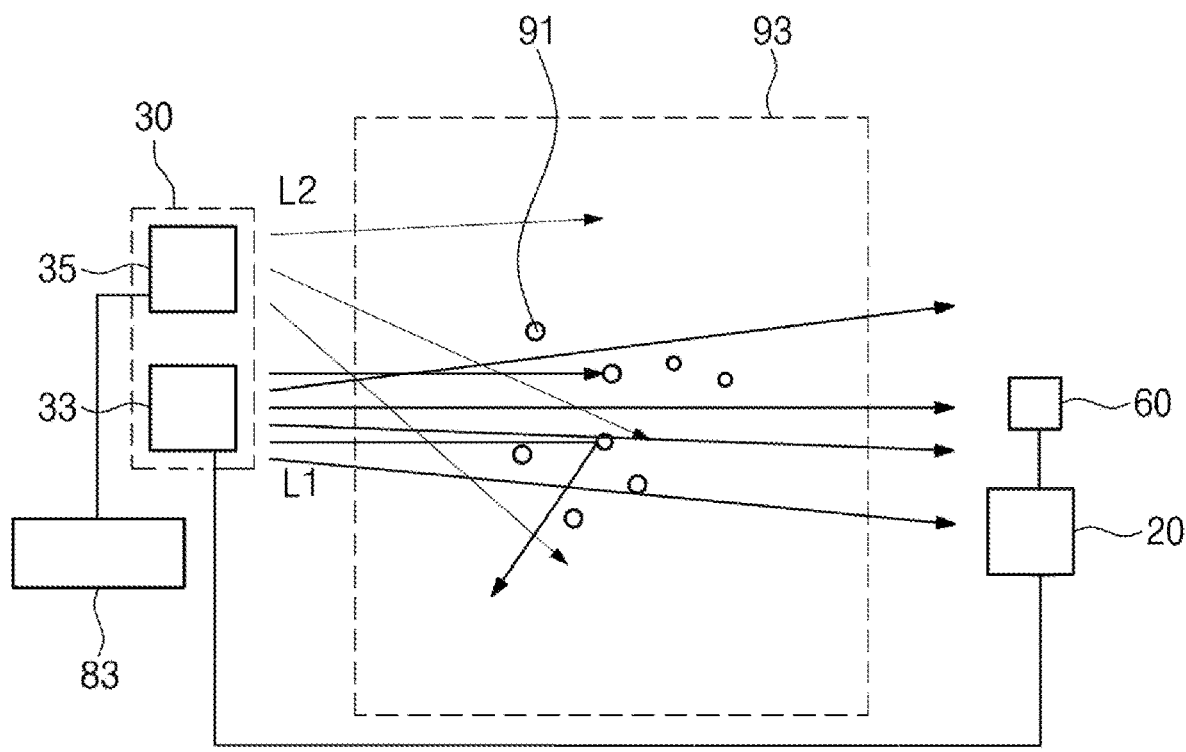
FIG. 8 is a conceptual diagram of a sterilization module according to a further embodiment of the present disclosure, wherein a first light source unit is connected to a photodiode.

FIG. 8 is a conceptual diagram of a sterilization module according to a further another embodiment of the present disclosure, where the first light source unit is connected to the photodiode.

In this embodiment, both the first sensor unit 60 and the first light source 33 may be operated without external power input. In this embodiment, both the first sensor unit 60 and the first light source 33 are driven by energy generated by the photodiode unit 20 using the light from the first and second light sources 33, 35, particularly, the second light from the second light source 35. That is, as the first light source 33 and the first sensor unit 60 may be driven by energy generated by the photodiode unit 20 which is obtained by recycling the light from the second light source 35, substantially no additional energy source is required to drive the first light source 33 and the first sensor unit 60.

In this embodiment, the first light source 33 and the first sensor unit 60 are connected to the photodiode unit 20 to be powered by the photodiode unit 20. The photodiode unit 20 may function not only as a detection sensor detecting the first light L1, but also as a photocell generating electric current using the received first light L1 and/or second light L2. The electric current generated by the photodiode unit 20 is supplied to the first light source 33 and the first sensor unit 60 to drive the first light source 33 and the first sensor unit 60. In other words, the first light source 33 and the first sensor unit 60 are powered by the photodiode unit 20 without being connected to a separate power supply 83.

The sterilization module can allow substantial real-time monitoring of germicidal effects on the particles 91 subject to elimination. In addition, since the first light source 33 and the first sensor unit 60 are driven by power generated by the photodiode unit 20 using the light emitted from the light source unit 30 without external power input, power supply costs can be reduced. Further, as a separate power supply to the photodiode unit 20, the first light source 33, and the first sensor unit 60 is omitted, the sterilization module can be compact and portable.

In another embodiment, the first light source and/or the first sensor unit may be provided as a single light source and/or a single sensor unit. However, it will be understood that the present disclosure is not limited thereto and the first light source and/or the first sensor unit may be provided as multiple light sources and/or multiple sensor units.

Figure 9:
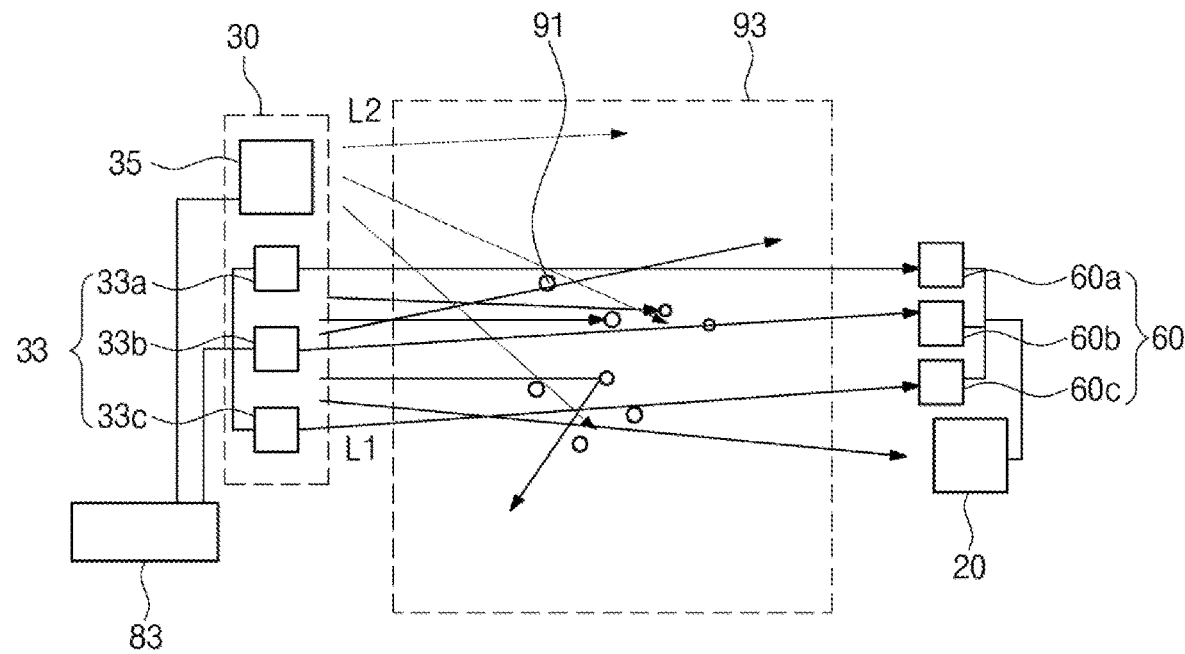
FIG. 9 is a conceptual diagram of a sterilization module according to yet another embodiment, wherein the sterilization module includes multiple light sources and multiple first sensor units.

FIG. 9 is a conceptual diagram of a sterilization module according to yet another embodiment, where multiple first light sources 33 and multiple first sensor units 60 are provided.

Referring to FIG. 9, the first light source 33 may include multiple sub-light sources. For example, the first light source 33 may include three sub-light sources, that is, first to third sub-light sources 33a, 33b, 33c. However, it will be understood that the present disclosure is not limited thereto and the first light source 33 may include two sub-light sources or four or more sub-light sources.

The first to third sub-light sources 33a, 33b, 33c may emit light having different wavelengths. The first sub-light source 33a may emit light having a first wavelength, the second sub light source 33b may emit light having a second wavelength different from the first wavelength, and the third sub-light source 33c may emit light having a third wavelength different from the first and second wavelengths. Provided that the first to third wavelengths are different from one another, the first wavelength, the second wavelength and the third wavelength may fall within one of the UV, visible, and infrared spectra, respectively. Accordingly, various combinations of wavelengths emitted from the sub-light sources are possible, such as a case where the first to third wavelengths all fall within the infrared spectrum, a case where one of the first to third wavelengths falls within the visible spectrum and the others fall within the UV spectrum, and the like.

The first sensor unit 60 may also include sensors detecting light having different wavelengths. For example, the first sensor unit 60 may include first to third sensors 60a to 60c detecting light having different wavelengths, and the second sensor unit 70 may also include first to third sensors 70a to 70c detecting light having different wavelengths.

The sensors of the first sensor unit 60 may detect first to third wavelengths different from one another, and various combinations of wavelengths detected by the sensors are possible, as in the first to third sub-light sources.

Although FIG. 9 shows that light from the first, second, and third sub-light sources 33a, 33b, 33c is detected by the first, second, and third sensors 60a, 60b, 60c of the first sensor unit 60, respectively, this is provided for convenience of description and the combination of the sub-light sources with the sensors may be varied depending on the wavelength band detectable by each sensor. For example, the light emitted from the first sub-light source 33a may be detected by the second sensor 60b of the first sensor unit 60, and various other combinations may be employed in other embodiments.

For example, in one embodiment, the first-wavelength light emitted from the first sub-light source 33a, the second-wavelength light emitted from the second sub-light source 33b, and the third-wavelength light emitted from the third sub-light source 33c may be UV light, visible light, and infrared light, respectively. In addition, the first-wavelength light detected by the first sensor 60a, the second-wavelength light detected by the second sensor 60b, and the third-wavelength light detected by the third sensor 60b may be UV light, visible light, and infrared light, respectively. When the light having various wavelengths (that is, the first to third wavelengths), emitted from the first light source 33, hits and eliminates the particles 91, scattering, reflection, absorption, or fluorescence by the particles 91 may occur. Upon absorption or fluorescence, the light can be wavelength-converted into first to third wavelengths different the first to third wavelengths set forth above. Such wavelength-converted light may also be detected by the first sensor unit 60. In other words, with the first sensor unit 60 adapted to detect the wavelength or irradiance of scattered light, reflected light, absorbed light, or fluorescently emitted light depending on the wavelength of the light emitted from the first light source, it is possible to determine the type, amount, and density of particles 91 subject to elimination.

As described above, according to this embodiment, the first to third sub-light sources 33a, 33b, 33c of the first light source 33 emit light having different wavelengths, respectively, which, in turn, is detected by the first to third sensors 60a, 60b, 60c of the first sensor unit 60. As a result, the type, amount, and density of various particles in the sterilization region, including the particles 91, can be determined based on the light detected by the first to third sensors 60a to 60c. According to this embodiment, through division of the wavelength from the light source unit 30 into first to third wavelengths, more detailed and accurate determination of the type, amount, and density of the particles 91 can be achieved.

Figure 10:
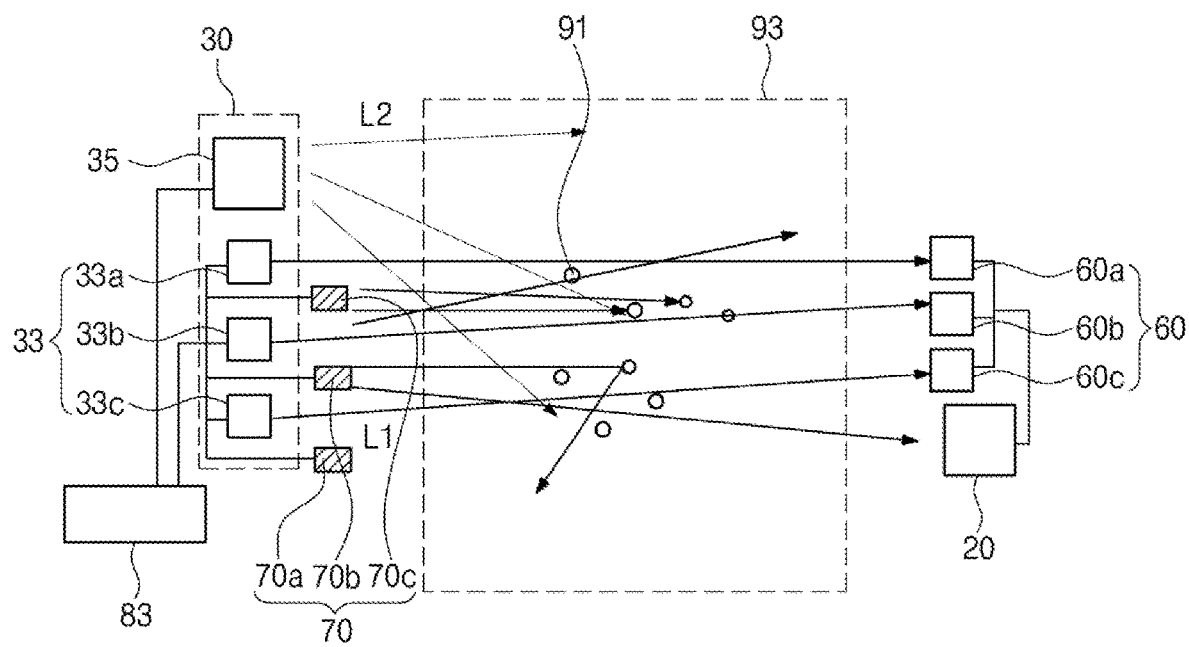
FIG. 10 is a conceptual diagram of a sterilization module according to yet another embodiment, wherein the sterilization module further includes a second sensor unit in addition to the light source unit and the first sensor unit.

FIG. 10 is a conceptual diagram of a sterilization module according to yet another embodiment, the sterilization module further including a second sensor unit 70 measuring the irradiance of light emitted from the light source unit, in addition to the light source unit and the first sensor unit.

Referring to FIG. 10, the second sensor unit 70 is disposed in the vicinity of the light source unit 30 to detect the irradiance of the light from the light source unit 30. The second sensor unit 70 is adapted to detect the irradiance from the light source unit 30, particularly, the irradiance from the first light source 33.

Although FIG. 10 shows that the second sensor unit 70 includes first to third sensors 70a, 70b, 70c associated one-to-one with the first to third sub-light source units 33a, 33b, 33c to detect the irradiances from the first to third sub-light source units 33a, 33b, 33c, respectively, it will be understood that the present disclosure is not limited thereto. The second sensor unit 70 may be different in number from the sub-light sources of the first light source 33 so long as the second sensor unit 70 can detect the irradiance of the first light source 33.

With the second sensor unit 70 detecting the irradiance from the first light source 33, it is possible to determine the type, amount, and density of the particles 91 subject to elimination in the sterilization region 93 through comparison with the irradiance detected by the first sensor unit 60. That is, the controller may determine the type, amount, and density of the particles 91 based on decrement in irradiance of the first light L1 obtained through comparison between the irradiance of the first light L1 from the first light source 33 measured by the second sensor unit 70 and the irradiance of the first light L1 measured by the first sensor unit 60. To this end, the controller may further include a comparator unit adapted to compare the intensity of the first light L1 measured by the second sensor unit 70 with the intensity of the first light L1 measured by the first sensor unit 60. The controller may control the power supply 83 and the light source unit 30 based on results of comparison by the comparator unit.

As described above, the sterilization module according to this embodiment can eliminate the particles 91 using the light source unit 30 and can detect the type, amount, and density of the particles 91 in real time using the first and second sensor units 60 and 70.

As described above, the controller can perform efficient sterilization with little power through substantially real-time control over the power supply and the light source unit based on data detected in real time. In the following embodiments, details thereof will be described.

Figure 11:
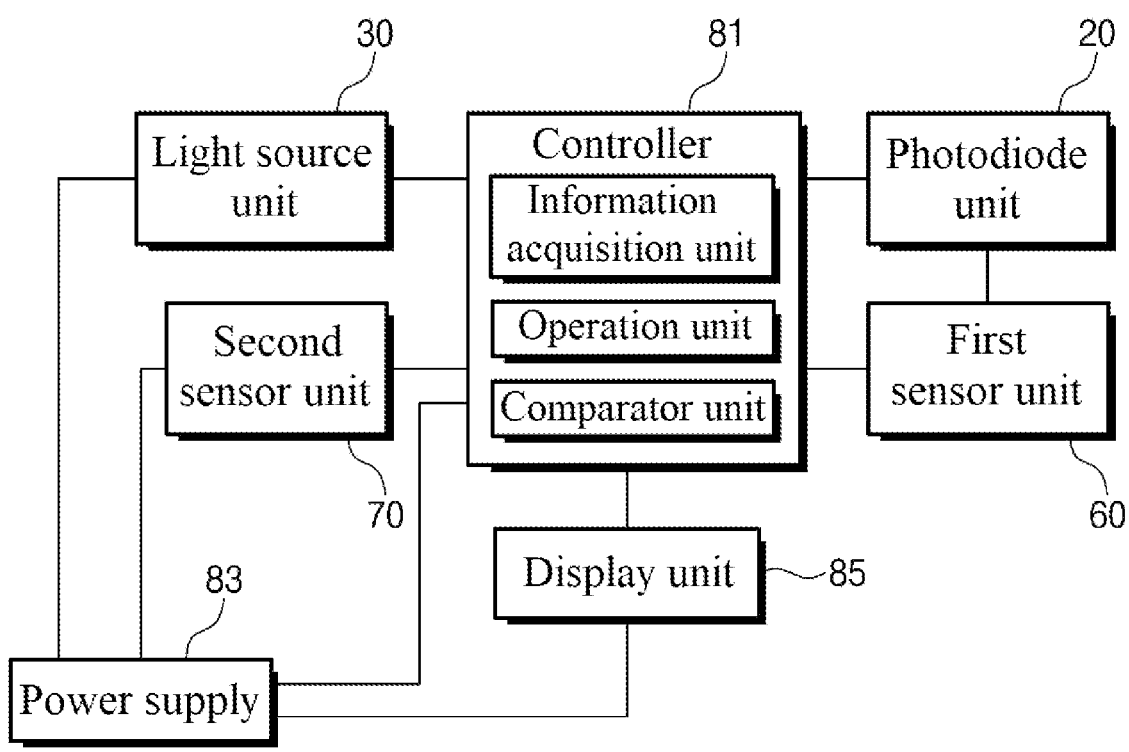
FIG. 11 is a schematic block diagram of a sterilization module according to yet another embodiment, given for description of a method of operating the sterilization module.

FIG. 11 is a schematic block diagram of a sterilization module according to yet another embodiment, given for description of a method of operating the sterilization module.

A sterilization module according to this embodiment includes a light source unit 30, a controller 81, a photodiode unit 20, first and second sensor units 60, 70, a display unit 85, and a power supply 83.

As described in the above embodiments, the light source unit 30 emits light. The light source unit 30 may include a single or multiple light sources. When the light source unit 30 includes multiple light sources, the light sources may emit light having different wavelengths.

The controller 81 is electrically connected to the light source unit 30 to control the light source unit 30.

As described in the above embodiments, the first and second sensor units 60, 70 detect light having passed through a sterilization region and light emitted from the light source unit 30, respectively. Each of the first and second sensor units 60, 70 may include a single or multiple sensors. When each of the first and second sensor units 60, 70 includes multiple sensors, the sensors may detect light having different wavelengths.

As described in the above embodiments, the photodiode unit 20 may detect the light from the light source unit 30 or generate power to be supplied to the first sensor unit 60 using the light.

The controller 81 may be electrically connected to the light source unit 30, the photodiode unit 20, and the first and second sensor units 60, 70 to acquire information from the light source unit 30, the photodiode unit 20, and the first and second sensor units 60, 70, and may perform calculations. To this end, the controller 81 may include an information acquisition unit and an operation unit.

The information acquisition unit receives signals detected by the first sensor unit 60 and the second sensor unit 70 to acquire information related to particles in a sample.

The operation unit receives the information related to the particles from the information acquisition unit, calculates the information, and provides the calculated target-related information to the display unit 85. The operation unit may include a circuit processing signals from the sensor units (for example, a signal amplification circuit).

In particular, the operation unit may calculate an attenuation rate of light due to scattering, absorption, fluorescence, and reflection through comparison of irradiances detected by the first and second sensor units 60, 70, thereby performing quantitative and/or qualitative analysis of particles to be detected. In addition, the operation unit may calculate information related to the irradiance of the light source unit 30, received from the second sensor unit 70, and may control the irradiance of the light source unit 30 through control over the power supply 83 based on the calculated information.

In one embodiment, the operation unit may pre-create a lookup table to quantitatively analyze the particles to be detected and may calculate the density and quantity of particles to be eliminated based on information in the lookup table.

The display unit 85 may be connected to the controller 81 to display information about sterilization to a user. The display unit 85 displays information related to the particles 91 received from the controller 81, for example, information on the type, amount, and density of the particles 91, in a form that can be visually recognized by a user.

The power supply 83 supplies power to the controller 81, the light source unit 30, the display unit 85, and the second sensor unit 70 and does not supply power to the photodiode unit 20 and the first sensor unit 60. The power supply 83 supplies power to the light source unit 30 and adjusts the irradiance of the light source unit 30 by increasing or decreasing the amount of electric current supplied to the light source unit 30 based on signals from the operation unit.

Although not shown in detail, signals between the light source unit 30, the first and second sensor units 60, 70, and the controller 81 are compared with one another to quantify the size, type, quantity, and density of the particles 91.

Next, an exemplary process of detecting the particles 91 using the sterilization module set forth above will be described.

First, the light source unit 30 is powered by the power supply 83.

The first sensor unit 60 detects an irradiance from the light source unit 30 and transmits information related to the irradiance to the controller 81. The controller 81 sets a reference value based on the received irradiance-related information.

After setting the reference value, the controller controls the light source unit 30 to emit light. Upon exposure to the light from the light source unit 30, the photodiode unit 20 generates power, which, in turn, is supplied as an energy source to the first sensor unit 60. The first sensor unit 60 detects light having passed through the particles 91, that is, measures an irradiance of scattered light, reflected light, absorbed light, and fluorescently emitted light in the sterilization region 93 with the particles 91 placed therein. The controller 81 calculates the amount or density of the particles 91 in the sterilization region 93 through comparison of the irradiance measured by the first sensor unit 60 with the irradiance from the light source unit 30 detected by the second sensor unit 70 using the comparator unit. If the amount or density of the particles 91 is reduced, the operation unit adjusts the irradiance of the light source unit by reducing the amount of electric current supplied from the power supply 83 to the light source unit 30.

Information obtained from the first and second sensor units 60, 70, such as the irradiance of scattered light, reflected light, absorbed light, and fluorescently emitted light, can be quantified into the size, type, quantity, and density of the particles to be eliminated through comparison with the reference value information in the pre-created lookup table. The quantified size, type, quantity, and density of the particles 91 may be displayed to a user through the display unit 85.

As described above, according to this embodiment, since the controller 81 provides various types of feedback to the first and second sensor units 60, 70, the light source unit 30, and the power supply 83 based on the data obtained from the first and second sensor units 60, 70, the light source unit 30, and the power supply 83, a highly reliable sterilization module can be obtained.

Although not shown separately, the sterilization module according to the present disclosure may be implemented as an Internet of Things (IoT)-based sterilization system.

According to one embodiment, the sterilization module is configured to be selectively turned on/off as needed by a user and to provide real-time monitoring of operation status of the light source unit and the like. For example, a sterilization system according to one embodiment includes a central processing unit, a user terminal, and the sterilization module set for the above. The central processing unit may store and manage status information, such as information as to whether the sterilization module is in operation or not, whether the sterilization module fails or not, how long the sterilization module has been operated, and the like, and may transmit a control signal to the controller of the sterilization module. The user terminal may allow a distant user to transmit a command to control (for example, turn on/off) the sterilization module or a command to request information to the central processing unit and to receive the information from the central processing unit. The sterilization module may be turned on/off and adjusted in sterilization speed and the like in response to a signal from the central processing unit.

The IoT-based sterilization system set forth above allows selective control over the sterilization module, such as operating the sterilization module to an extent appropriate to each situation based on user detection or the like. Accordingly, the IoT-based sterilization system can minimize power consumption and can allow easy determination of the current operation status of the sterilization module or the presence/absence of an abnormality in the light source. As a result, efficient management and handling can be achieved.

The sterilization module according to the present disclosure may be mounted on a device provided therein with a sterilization region in which particles enter, for example, a case or housing receiving particles. That is, a sterilization apparatus according to the present disclosure may include the sterilization module connected to the case or housing and sterilizing the sterilization region by eliminating the particles received in the sterilization region.

Figure 12:
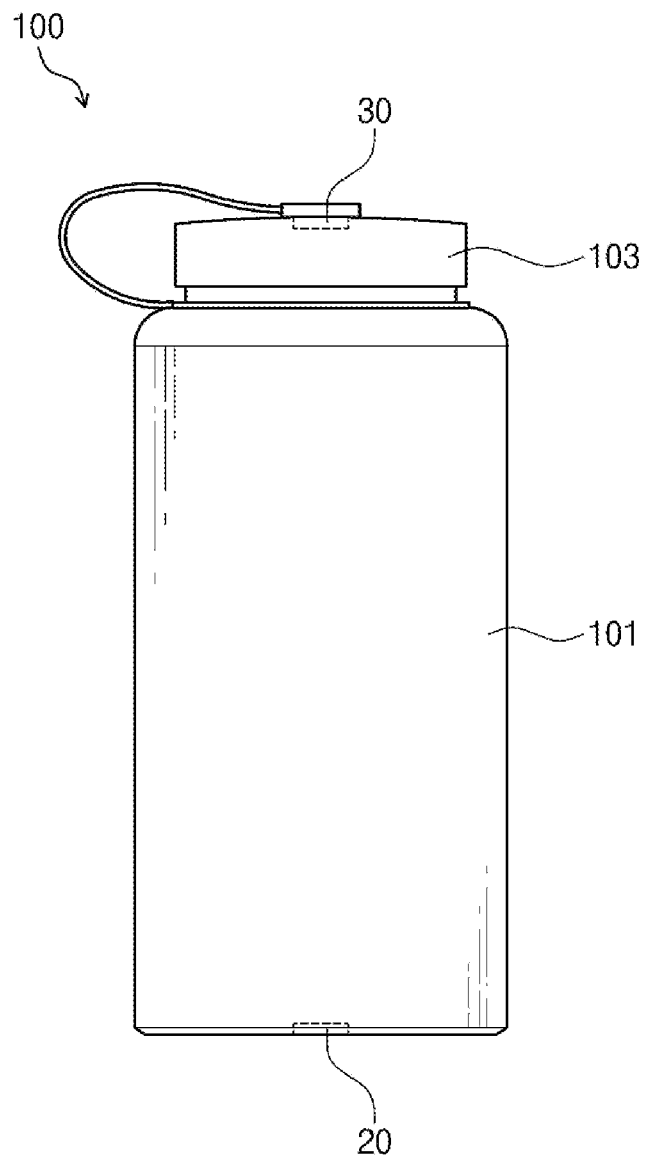
FIG. 12 is a view of an article employing the sterilization apparatus according to the present disclosure, wherein a water bottle is provided as an example of the article.

FIG. 12 is a view of a sterilization apparatus according to one embodiment of the present disclosure, wherein a water bottle is provided as an example of the case.

Referring to FIG. 12, the sterilization module according to the present disclosure may be used to sterilize various devices in need of sterilization. For example, the sterilization module according to the present disclosure may be employed in a water bottle 100.

The water bottle 100 according to this embodiment may include a main body 101 provided therein with a sterilization region 93 adapted to hold water therein and open at a top thereof, a lid 103 covering the open top of the main body, a light source unit 30, a photodiode unit 20, and a power supply. The light source unit 30, the photodiode unit 20, and the power supply may be disposed on the main body 101 and/or the lid 103. The light source unit 30 may emit light toward the sterilization region and may include a first light source emitting a first light and a second light source emitting a second light sterilizing the sterilization region.

In some forms, the light source unit 30 and the photodiode unit 20 may face each other with the water placed therebetween. For example, the light source unit 30 may be disposed on the lid 103 and the second light emitted from the second light source of the light source unit 30 sterilizes the water in the sterilization region 93 in the main body 101. The photodiode unit 20 may be disposed at a bottom of the main body 101 to detect the light emitted from the first light source of the light source unit 30. The power supply may be disposed adjacent to the light source unit 30 and may be a battery.

In other forms, the water bottle 100 may be sterilized using the sun as a light source. In this case, the illustrated light source unit 30 may be omitted. In addition, since the light source unit is omitted, the power supply connected to the light source unit may also be omitted. In this case, since the light source unit 30 and the power supply are omitted, the sterilization apparatus can be implemented as a compact and light sterilization apparatus, which is highly applicable to portable devices.

In particular, the sterilization apparatus according to the present disclosure may be applied to an article used outdoors. In outdoor environment, a germicidal light component in sunlight has higher intensity than indoors, whereby the article can be more effectively sterilized. When the sterilization apparatus is used outdoors, the light source unit and the power supply may be omitted, excluding the photodiode unit, as in the water bottle described above.

The sterilization apparatus according to the present disclosure may be applied to any article in need of sterilization, without limitation. For example, the sterilization apparatus may be used in bedding or clothing sterilizers, vacuum cleaners, other surface sterilizers, air cleaners, and deodorizers. When the sterilization apparatus according to the present disclosure is employed in a bedding sterilizer, the bedding sterilizer may include the light source unit and the photodiode unit disposed on an optical path of light emitted from the light source unit and having been reflected or scattered by bedding.

According to this embodiment, as the photodiode unit provided together with the light source unit is operated without a separate power supply, it is possible to significantly downsize the sterilization apparatus, allowing easy application to portable articles such as water bottles as well as to bedding sterilizers as described above.

Although some embodiments have been described herein, it should be understood by those skilled in the art that these embodiments are given by way of illustration only and the present disclosure is not limited thereto. In addition, it should be understood that various modifications, variations, and alterations can be made by those skilled in the art without departing from the spirit and scope of the present disclosure.

Therefore, the scope of the present disclosure should be limited only by the accompanying claims and equivalents thereto.

What is claimed is:
1. A light radiation module comprising:
 a first light source disposed on a substrate and configured to emit first light toward target particles in a sterilization region and sterilize the target particles;
 a power supply electrically connected to the first light source and configured to supply power to the first light source;
 a second light source disposed on the substrate and configured to emit second light and detect a presence of the target particles;
 a photodiode configured to detect the second light from the second light source and configured to generate power based on the second light source that is electrically disconnected from the power supply, the photodiode connected to the second light source and operating as a photocell generating the power and providing the power to the second light source to operate the second light source without being connected to the power supply;
a first sensor disposed adjacent to the photodiode and configured to detect the first light, the first sensor connected to the photodiode and being powered by the photodiode; and
a controller electrically connected to each of the first light source, the second light source, the power supply, and the photodiode and configured to control the power supply based on a detection of the second light by the photodiode.

2. The light radiation module according to claim 1, further comprising:
a display unit connected to the controller and displaying whether the first light source is in need of replacement based on an intensity of the first light detected by the photodiode.

3. The light radiation module according to claim 1, wherein the controller controls power supplied from the power supply to the first light source based on an intensity of the first light detected by the photodiode.

4. The light radiation module according to claim 1, wherein the first sensor is disposed adjacent to the photodiode.

5. The light radiation module according to claim 4, wherein the first light source is powered by the photodiode.

6. The light radiation module according to claim 4, further comprising:
a second sensor disposed to be more proximate to the second light source than to the photodiode, the second sensor detecting an intensity of the first light.

7. The light radiation module according to claim 6, wherein the first light source comprises multiple sub-light sources emitting light having different wavelengths, and the first sensor comprises multiple sensors corresponding to the respective multiple sub-light sources.

8. The light radiation module according to claim 7, wherein the second sensor comprises multiple sensors corresponding to the respective multiple sub-light sources.

9. The light radiation module according to claim 6, wherein the controller further comprises a comparator comparing the intensity of the first light detected by the second sensor and the intensity of the first light detected by the first sensor to control the first light source based on results of comparison by the comparator.

10. The light radiation module according to claim 7, wherein the first sensor detects scattered light in the sterilization region, fluorescence in the sterilization region, or both.

11. The light radiation module according to claim 1, wherein the first light source emits the first light in a range of 100 nm to 1 mm.

12. The light radiation module according to claim 1, wherein the first light source emits infrared light, visible light, UV light, or a combination thereof.

13. A sterilization apparatus comprising:
a housing comprising a sterilization region in which particles to be eliminated enter; and
the light radiation module according to claim 1, the light radiation module being connected to the housing such that the sterilization region in which the target particles enter corresponds to the sterilization region, the light radiation module configured to sterilize the particles in the sterilization region.

14. The sterilization apparatus according to claim 13, wherein the housing comprises a pipe that receives a fluid containing the particles subject to elimination.

15. The sterilization apparatus according to claim 14, wherein the pipe has an inlet through which the fluid is introduced into the pipe and an outlet through which the fluid is discharged from the pipe, and the first light source irradiates an interior of the pipe.

16. A sterilization apparatus comprising:
a sterilization region where particles enter and stay;
a light radiation module comprising:
a first light source disposed on a substrate and configured to emit first light and coupled to the sterilization region such that the first light emitted from the first light source reaches the particles in the sterilization region and sterilizes the particles;
a power supply electrically connected to the first light source and configured to supply power to the first light source;
a second light source disposed on the substrate and configured to emit second light and detect a presence of the particles;
a photodiode arranged to detect the second light from the second light source without being connected to a power supply electrically connected to the first light source, the photodiode configured to operate as a photocell generating power based on the second light source that is electrically disconnected from the power supply and provide the power to the second light source to operate the second light source without being connected to the power supply;
a first sensor disposed adjacent to the photodiode and configured to detect the first light, the first sensor connected to the photodiode and being powered by the photodiode; and
a controller electrically connected to the first light source, the second light source, the power supply, and the photodiode and configured to control the power supply based on a detection of the second light by the photodiode.

17. The sterilization apparatus of claim 16, further comprising a sensor coupled to the photodiode and powered by the photodiode.

* * * * *